April 27, 1965   E. H. BOISSONNAS   3,181,056
WELL LOGGING METHODS AND APPARATUS FOR RECORDING A WIDE RANGE
OF MEASURED VALUES AS A CONTINUOUS CURVE ON A SINGLE SCALE
Filed June 16, 1959   4 Sheets-Sheet 1
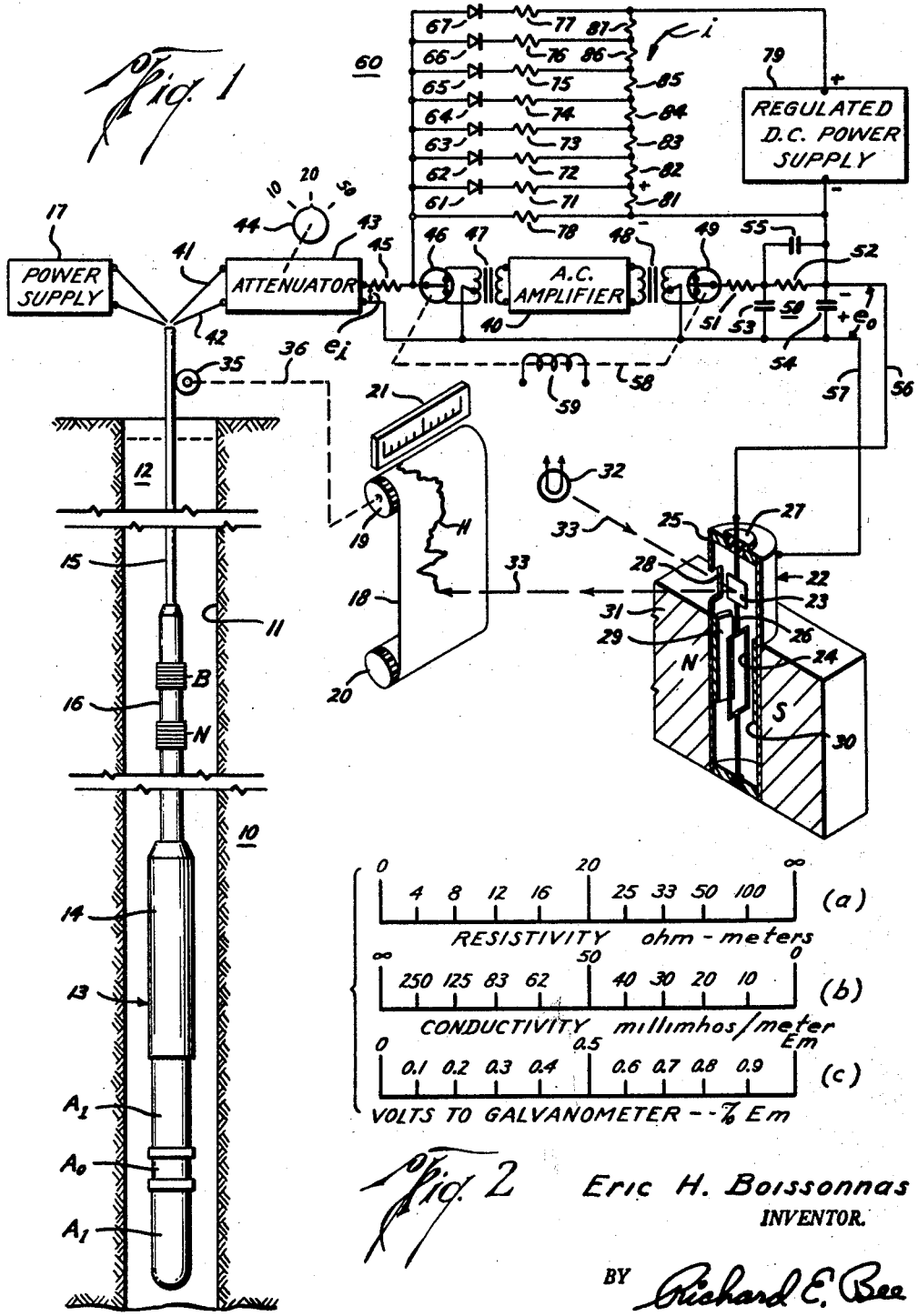
Eric H. Boissonnas
INVENTOR.
BY Richard E. Bee
ATTORNEY Eric H. Boissonnas
INVENTOR.

BY Richard E. Bee

ATTORNEY

Eric H. Boissonnas
INVENTOR.

BY Richard E. Bee
ATTORNEY

Eric H. Boissonnas
INVENTOR.

ATTORNEY

# United States Patent Office 3,181,056
Patented Apr. 27, 1965

3,181,056
WELL LOGGING METHODS AND APPARATUS FOR RECORDING A WIDE RANGE OF MEASURED VALUES AS A CONTINUOUS CURVE ON A SINGLE SCALE
Eric H. Boissonnas, New Canaan, Conn., assignor to Schlumberger Well Surveying Corporation, Houston, Tex., a corporation of Texas
Filed June 16, 1959, Ser. No. 820,760
17 Claims. (Cl. 324—1)

This invention relates to apparatus for investigating subsurface earth formations traversed by a borehole and, particularly, to apparatus for recording the results of such investigation.

It is important to know the nature and characteristics of the various subsurface earth formations adjacent a borehole drilled into the earth. In the case of oil well boreholes, for example, this information enables the presence and depth of any oil-bearing or gas-bearing formations to be determined. Various types of apparatus have been heretofore proposed for measuring different characteristic properties of these subsurface formations. For example, electrode systems and coil systems have been proposed for measuring the electrical resistance characteristics of the adjacent formations. Similarly, sonic and radioactivity systems have been proposed for measuring the acoustic and the atomic properties of the formations. In all of these systems, a continuous record or log is made of the output signals developed by the measuring or sensing apparatus as such apparatus is moved through the borehole. By studying and properly interpreting such records or logs, much valuable information is obtained regarding the subsurface formations.

A problem is frequently encountered in these systems in that the characteristic being measured is generally subject to a relatively wide range of variation. In the case of an electrode system for example, the value of the formation resistivity may vary over a range of from zero to infinity. This makes it difficult to record the results of such measurements on a recording medium or film strip of finite width. The problem is further complicated by the fact that certain portions of the range are of "quantitative" interest, that is, intended to be used in making various mathematical calculations, while other portions of the range are generally used in only a "qualitative" sense in order to obtain an approximate picture of the subsurface conditions. Consequently, if the sensitivity of the apparatus is adjusted so as to enable practically all of the signal range to fit on a single scale, then the portions which are used for quantitative calculations will be too compressed or crowded together for the purposes of accurate determinations.

One solution heretofore proposed utilizes a signal recorder employing light beams and a number of mirror galvanometers as the recording elements and a light-sensitive photographic film as the recording medium upon which the record is made. In this case, the measure signal is simultaneously applied to several of the galvanometer units, these units and the circuits associated therewith being adjusted so as to provide a different gain factor or sensitivity factor for the different units. In this manner, different portions of the curve will be recorded in differing degrees of detail. This, however, results in a multiplicity of curves which, in turn, renders the interpretation more difficult. Also, some portions of some of these curves will be discontinuous in nature as the corresponding galvanometer units swing off scale for large signal values. Furthermore, this requires the use of a greater number of galvanometer units than is sometimes desirable.

Another possible solution heretofore proposed is to use a pair of mirror galvanometers having different sensitivity factors associated therewith and arranged so that the low sensitivity galvanometer will swing onto one side of the scale as the higher sensitivity galvanometer goes off scale on the other side. The lower sensitivity galvanometer thus produced a so-called "backup" scale. This again produces a discontinuous type of curve. It also tends to clutter up the record, especially where it is desired to record curves for several different types of measuring devices at the same time. Systems of this type are described in greater detail in Patent Nos. 2,258,700 and 2,457,214, both granted to H. G. Doll, the former on October 14, 1941, and the latter on December 28, 1948.

Another solution that has been proposed for the case of electrode type apparatus is described in Patent No. 2,776,402, granted to F. P. Kokesh on January 1, 1957. In this system, the circuits for energizing the electrodes are modified to introduce a deliberate variation into the operation of the electrode system so as to reduce the electrode current as the value of the formation resistivity increases. This, in turn, reduces the rate of increase of the output measure signal as the absolute value thereof increases. In this manner, a wide range of resistivity values may be recorded as a single curve on a single scale of finite width. While providing what, in many cases, are useful results, this form of apparatus suffers from the disadvantage that the entire scale range is nonlinear in nature thus making quantitative interpretation more difficult and more susceptible to error. Also, this form of apparatus is not readily adaptable for use with other types of borehole logging systems.

It is an object of the invention, therefore, to provide new and improved apparatus for measuring characteristic properties of subsurface earth formations adjacent a borehole.

It is another object of the invention to provide new and improved borehole investigating apparatus which enables the results of such investigation to be presented in a manner which is more easily and more accurately understood and interpreted.

It is a further object of the invention to provide new and improved borehole investigating apparatus which enables a wide range of measure values to be recorded as a continuous curve on a single scale and wherein one range of values is accurately and sufficiently detailed for purposes of quantitative analysis while another range is displayed with no greater accuracy than is necessary for general qualitative purposes.

In accordance with the invention, apparatus for investigating earth formations traversed by a borehole comprises sensing means adapted for movement through the borehole for developing electrical signals representative of a characteristic property of the adjacent earth formations. The apparatus further includes means for recording a first range of values of the electrical signals in a precisely linear manner and a second range of values of the electrical signals in a compressed nonlinear manner.

For a better understanding of the present invention, together with other and further objects thereof, reference is had to the following description taken in connection with the accompanying drawings, the scope of the invention being pointed out in the appended claims.

Referring to the drawings;

FIG. 1 is a partially cross-sectional, partially schematic view of a representative embodiment of borehole investigating apparatus constructed in accordance with the present invention;

FIG. 2 shows typical recorder scales which may be used with the FIG. 1 apparatus;

Figure 3:
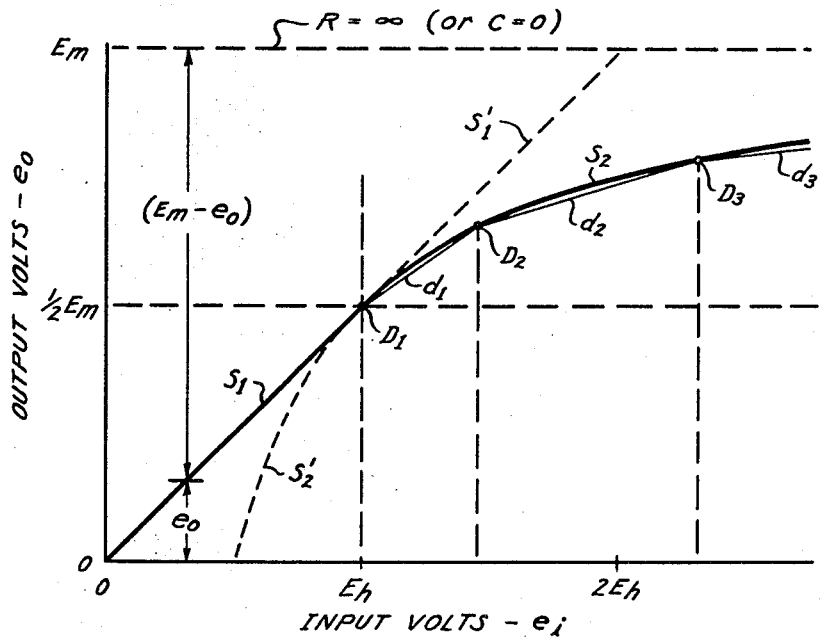
FIG. 3 is a graph used in explaining the operation of the FIG. 1 apparatus.

Referring to FIG. 1 of the drawings, there is shown a representative embodiment of apparatus constructed in accordance with the present invention for investigating earth formations 10 traversed by a borehole 11. The borehole 11 is filled with a conductive liquid or drilling mud 12. The apparatus of the present invention includes sensing means 13 adapted for movement through the borehole 11 for developing electrical signals representative of a characteristic property of the adjacent earth formations. In the present embodiment, this sensing means takes the form of a fluid-tight instrument housing 14 having an electrode system mounted on the lower portion of the exterior thereof. The electrode system includes a survey current electrode $A_0$ located intermediate a pair of elongated focussing current electrodes $A_1$. Within the instrument housing 14 is contained suitable electrical circuits for energizing the $A_0$ and $A_1$ electrodes and for developing output signals representative of the formation resistance encountered by the survey current emitted from the $A_0$ electrode. An electrode system of this type, as well as the associated operating circuits, are described in greater detail in Patent No. 2,712,628, granted to H. G. Doll on July 5, 1955.

The sensing means 13 is suspended in the borehole 11 by means of an armored multiconductor cable 15 which extends upwardly through the borehole to a suitable drum and winch mechanism located at the surface of the earth. In this manner, the sensing means 13 may be moved through the borehole 11 to explore the entire length thereof. The first 100 feet or so of the armored cable 15 is covered with a layer of insulation material 16. Located towards the upper end of this insulation material 16 are an electrically-remote current-return electrode B and an electrically-remote potential-reference electrode N, each of which is connected to the electrical circuits in the instrument housing 14 to afford suitable current-return and potential-reference points for the electrode energizing and signal developing circuits. Electrical power for operating the downhole electrode circuits is supplied by a power supply unit 17 located at the surface of the earth. This power supply 17 is connected to the downhole circuits by way of a pair of the insulated conductors of the armored cable 15.

The apparatus of the present invention also includes means for recording a first range of values of the electrical signals developed by the downhole sensing means 13 in a precisely linear manner and for recording a second range of values of the electrical signals in a compressed nonlinear manner. To this end, the apparatus further comprises linear recording means located at the surface of the earth. This recording means includes a movable recording medium which, in the present embodiment, takes the form of a light-sensitive photographic film strip 18. This film strip or recording medium 18 is adapted to be moved between a pair of spaced apart roller drums or spools 19 and 20. The recording means also includes an electrical scale range at right angles to the direction of movement of the recording medium 18. This scale range is depicted by a calibrated scale 21 located adjacent the upper roller drum 19. The recording means further includes an electrically-responsive linear recording element which, in the present embodiment, takes the form of a mirror-type galvanometer unit 22.

The galvanometer unit 22 includes a light-reflecting mirror 23 and an elongated deflection coil 24 suspended between the upper and lower ends of a cylindrical housing or barrel portion 25 by way of a suspension wire 26. The lower end of the suspension wire 26 is both electrically and mechanically connected to the bottom of the barrel portion 25, while the upper end is mechanically connected to the top of the barrel 25 by means of an electrically insulated bushing 27. Electrical connection to the deflection coil 24 is made by way of the suspension wire 26. The end of the suspension wire 26 extending through the bushing 27 together with any suitable point on the barrel portion 25 thus constitute a pair of electrical input terminals for the galvanometer unit 22. A light transparent window 28 is provided in the upper portion of the barrel 25 adjacent the mirror 23. Soft iron pole pieces 29 and 30 extend through slots in the barrel 25 adjacent the deflection coil 24. The barrel 25 is, in turn, located in a permanent magnet block 31 with the pole pieces 29 and 30 aligned with north and south poles "N" and "S" of the permanent manget block 31. The resulting magnetic flux field passing through the deflection coil 24 will then interact with any electromagnetic field set up by the flow of direct current through the coil 24 to produce rotation of the suspension wire 26 and, thus, the mirror 23. For small angles, the magnitude of this rotation will be directly proportional to the magnitude of such current flow. In other words, the galvanometer unit 22 is constructed so that the deflection of the mirror 23 is linearly related to the current flow through coil 24.

In order to produce a record or trace on the photographic film strip 18, the recording means further includes a light source 32 for emitting a beam of light indicated by dash line 33. This light beam impinges on the mirror 23 and then is reflected to the photographic film 18. The distances between light source 32, mirror 23 and the photographic film 18 are selected so that the mirror 23 is required to rotate through only a relatively small angle in order to deflect the light beam 33 across the entire width of the film strip 18. In this manner, there is provided linear recording means which will respond to the electrical signals developed by the sensing means 13 to produce a continuous trace or curve H on the recording medium 18.

The apparatus of the present invention also includes means for advancing the recording medium 18 in synchronism with the movement of the sensing means 13 through the borehole 11. In this embodiment, this includes a mechanical measuring wheel 35 which bears against the armored cable 15 and is rotated by movement thereof. This measuring wheel 35 is, in turn, geared to the roller drum 19 as indicated schematically by dash line 36.

The apparatus of the present invention further includes means for causing a first range of values of the electrical signals developed by the sensing means 13 to be recorded in a precisely linear manner and for causing a second range of values of these electrical signals to be recorded in a compressed, nonlinear manner. In the present embodiment, this means includes a level-sensitive variable-gain signal-translating circuit coupled in the electrical signal path intermediate the sensing means 13 and the galvanometer unit 22 and which is responsive to signals in a first amplitude range for developing output signals which are directly and linearly proportional thereto and which is responsive to signals in the remaining amplitude range for developing output signals which are compressed by an amount which increases as the input signal value increases.

This level-sensitive signal-translating circuit includes a high-gain alternating-current amplifier 40 connected in the signal path between the sensing means 13 and the galvanometer 22. The electrical signals from the sensing means 13 are supplied to the input side of this amplifier 40 by way of cable conductors 41 and 42 and a calibrated attenuator 43 having an adjustable control knob 44 for adjusting the attenuation factor thereof. The output of the attenuator 43 is connected by way of an input adding resistor 45 to the vibrating contact element of a signal chopper or vibrator unit 46. The two output terminals of the chopper 46 are connected to an input transformer 47 of the amplifier 40. In a similar manner, the output side of the amplifier 40 is connected by way of an output transformer 48 to a second signal chopper or vibrator unit 49. Input transformer 47 and output transformer 48 are connected with the appropriate polarity so as to provide a 180° phase change or polarity reversal between the input of transformer 47 and the output of transformer 48. The vibrating contact element of the output chopper unit 49 is, in turn, connected to a low-pass or "smoothing" filter 50 which includes resistors 51 and 52 and condensers 53–55. The output side of the low-pass filter 50 is connected to galvanometer unit 22 by way of a pair of conductors 56 and 57. The two chopper units 46 and 49 are operated in synchronism with one another as indicated by dash line 58. This synchronous operation is achieved by utilizing a common energizing winding 59 for the vibrating elements of these two chopper units. Winding 59 is energized by suitable alternating current having, for example, a frequency of 60 cycles.

The level-sensitive signal-translating circuit includes, in addition to the amplifier 40, a level-sensitive feedback circuit coupled thereto and responsive to a first range of the electrical signal values for holding constant the effective gain factor associated with amplifier 40 and responsive to the remaining range of electrical signal values for decreasing the effective gain factor as the signal values increase. This feedback circuit includes a biased diode network 60 connected between the output side of the low-pass filter 50 and the input side of the first chopper unit 46. This network 60 includes seven parallel branches, each containing one of the diodes 61–67, inclusive, and one of feedback resistors 71–77, inclusive. A further branch or path including only a feedback resistor 78 is coupled in parallel with these diode paths for stabilizing the operation of the amplifier system. Bias voltages for the diodes 61–67 are provided by a regulated direct-current power supply 79 and a voltage divider formed by series-connected resistors 81–87 inclusive. In other words, biasing voltages are developed across these resistors 81–87 by the flow of direct current $i$ provided by the power supply 79.

Considering now the operation of the FIG. 1 apparatus, it shall initially be assumed that the downhole sensing means 13 is operated to emit a survey current flow of constant magnitude from the $A_0$ electrode and to monitor the resulting voltage level of this $A_0$ electrode. At the same time, an adjustable focussing current is emitted from the upper and lower $A_1$ electrodes. When this is done, the resulting electrical output signal is directly proportional to the resistivity of the formation material in front of the $A_0$ electrode. In this manner, as the sensing means 13 is moved through the borehole 11, electrical output signals are developed and transmitted up the armored cable 15 which are representative of the resistivity values along the course of the borehole 11. These signals are supplied by way of the conductors 41 and 42 to the input of the attenuator 43. Note that the remainder of the electrical circuits of this embodiment which are located at the surface of the earth, namely the level-sensitive signal translating means and the recording means, are intended for operation with direct current type signals. Consequently, if the $A_0$ and $A_1$ electrodes are energized with alternating current instead of direct current, then a suitable detector or rectifier circuit is to be included in the signal path either in the downhole instrument housing 14 or else at the surface of the earth ahead of or immediately following the attenuator 43.

Before considering the operation of the remainder of the FIG. 1 apparatus, it will be helpful to consider the results that are desired. To this end, reference will now be made to FIG. 2 of the drawings wherein are shown three possible calibrations, ($a$), ($b$), and ($c$), for the calibrated scale 21 associated with the recording medium 18. The graduation marks on each of these scales of FIG. 2 are evenly spaced along the scale range. The numerical values attached to the graduation marks of scale ($a$) are in terms of formation resistivity, the scale extremity at the left hand side of the scale range corresponding to zero resistivity and the scale extremity at the right hand side of the range corresponding to infinite resistivity. The mid-scale value for this particular example has a value of 20 ohm-meters. This corresponds to the middle position of the attenuator control knob 44. The scale calibration for the left hand side of the scale range from 0 to 20 ohm-meters is linear in nature, the numerical values increasing in a uniform manner from zero to twenty. The scale calibration for the right hand side of the scale range from 20 ohm-meters to infinity, however, is highly nonlinear, the numerical values increasing in a quite uneven though mathematically regular manner.

For this scale range the scale may instead be calibrated in terms of formation conductivity. When this is done, the calibration has the appearance of scale ($b$) of FIG. 2. Note that "conductivity" is the reciprocal of "resistivity." Accordingly, the right hand extremity of scale ($b$) corresponds to zero conductivity, while the left hand extremity corresponds to infinite conductivity. These values being the reciprocals of the corresponding resistivity values of scale ($a$). Similarly, the mid-scale value of 50 millimohs per meter of scale ($b$) is the reciprocal of the 20 ohm-meter mid-scale value of scale ($a$). For scale ($b$), however, the apparatus of the present invention is so constructed that the numerical values over the right hand portion of the scale-range from 0 to 50 increase in a linear manner, while the numerical values over the left hand portion of the scale range from 50 to infinity increase in an uneven or nonlinear manner.

It is thus seen that the present invention enables a continuous curve of the electrical signal values to be recorded on the recording medium 18 wherein the signal values recorded over the left hand half of the scale range are recorded in a precisely linear manner with respect to the left hand scale extremity, while the reciprocal of the signal values recorded over the right hand half of the scale range are recorded in a linear manner with respect to the righthand scale extremity. In terms of formation resistivity and conductivity, this means that the scale is linear in terms of resistivity over the left hand half and linear in terms of conductivity over the right hand half.

Scale ($c$) of FIG. 2 shows another possible scale calibration expressed in terms of the magnitude of the direct-current signal supplied to the galvanometer unit 22. Scale ($c$) is plotted in terms of fractional values of $E_m$, where $E_m$ represents the voltage required for maximum on-scale deflection of the galvanometer mirror 23. Scale ($c$) shows that the recording means formed by the galvanometer unit 22, light source 32 and the recording medium 18 is, of itself, linear in nature. In other words, the transverse position of the light beam 33 on the recording medium 18 relative to say an edge thereof is directly proportional to the value of the direct current supplied to the galvanometer coil 24.

In view of the fact that the galvanometer system is linear in nature, the nonlinearity required to produce the novel scale presentation of the present invention is provided by the level-sensitive signal-translating circuit formed by amplifier 40, biased diode network 60 and the associated circuit elements coupled in the signal path between the attenuator 43 and the galvanometer unit 22. The manner in which this level-sensitive signal-translating circuit operates to provide this result will now be explained.

To this end, the direct-current signal $e_1$ appearing at the output of attenuator 43 is supplied to the first signal chopper unit 46 which serves to chop or modulate this direct-current signal at a 60 cycle rate so as to produce across the primary winding of transformer 47 a 60 cycle signal which is amplitude modulated in accordance with the value of the direct-current signal $e_1$. This modulated 60 cycle signal is then amplified by the alternating current amplifier 40 and applied by way of output transformer 48 to the second chopper unit 49. This chopper unit 49 operates in synchronism with the input chopper unit 46 so as to rectify or convert the alternating-current signal back into a direct-current signal. Any ripple components in this rectified direct-current signal are then removed by the low-pass filter 50. Consequently, there appears at the output of filter 50 a direct-current output signal $e_o$ which is an amplified replica of the direct current input signal $e_i$. Because of the polarity reversal provided by transformer 47 and 48, this output signal $e_o$ is a negative going signal which becomes more negative as the input signal $e_i$ becomes more positive.

The output signal $e_o$ is supplied by way of the conductors 56 and 57 to the galvanometer unit 22 to produce a corresponding deflection of the mirror 23 which, in turn, produces a corresponding deflection of the light beam 33 on the photographic film 18. It is assumed for the resistivity type input signal of the present example that the galvanometer unit 22 is adjusted so that the light beam 33 is at rest on the left-hand scale extremity of the film 18 when no current is flowing through the deflection coil 24. This may be readily achieved by properly orienting the galvanometer barrel 25 in the permanent magnet block 31.

A portion of the direct-current output signal $e_o$ appearing at the output of the filter 50 is supplied back by way of feedback resistor 78 to the input of the first chopper unit 46. This serves to stabilize the operation of the amplifier system. This feedback is negative or degenerative in nature and, hence, reduces somewhat the effective overall gain of the amplifier system. This feedback fraction or feedback factor provided by the resistor 78 path, however, is constant so that the effective overall gain likewise remains constant for the lower signal levels.

The effective overall gain of the amplifier system formed by this level-sensitive signal-translating circuit is further controlled by the level-sensitive feedback circuit means represented by the biased diode network 60 to obtain the desired modification of the signal values to be recorded, for the present example, over the right-hand half of the scale range. The operation of this biased diode network 60 will be explained with the aid of the graph of FIG. 3. This graph represents the effective overall signal transfer characteristic or gain characteristic of the amplifier system. Plotted along the horizontal axis of FIG. 3 are values of the direct-current input voltage $e_i$. This input voltage, for the present embodiment, is directly proportional to the formation resistivity measured by the sensing means 13. $E_h$ represents the value of the input voltage $e_i$ which corresponds to the formation resistivity value which it is desired to record at the half-scale point. For the present example, a voltage value of $E_h$ corresponds to a resistivity value of 20 ohm-meters. The vertical axis of FIG. 3, on the other hand, is plotted in terms of the output voltage $e_o$. This output voltage $e_o$ will cause a deflection of the light beam 33 which is directly proportional thereto. $E_m$ represents the value of output voltage $e_o$ required to produce maximum deflection of the light beam 33, that is, the deflection which corresponds to the right-hand extremity of the scale range. This $E_m$ level corresponds to a resistivity value "R" of infinity or a conductivity value "C" of zero.

In order to produce a linear record or trace on the recording medium 18 over the left-hand half of the scale range, the zero to mid-scale portion of the amplifier system signal transfer characteristic of FIG. 3 is in the form of a straight line segment $S_1$ which is precisely linear in nature. In other words, over this portion of the range the gain factor of the amplifier system remains constant. Over this linear portion of the range, the diodes 61–67 are biased to a nonconductive condition in view of the fact that the cathode terminals thereof are maintained positive by the bias voltages which are developed across resistors 81–87, these positive bias voltages being greater than the negative value of the output signal $e_o$ over this portion of the range. Consequently, the amplifier system gain factor remains constant at a value determined by the gain of amplifier 40 and the feedback factor of the path provided by resistor 78. Over this linear portion of the scale range, the relationship between the input and output voltages $e_i$ and $e_o$ may be expressed by the following relationship:

$$e_o = A e_i \tag{1}$$

where A denotes a proportionality constant which is, in fact, the effective overall gain factor of the amplifier system over this portion of the range.

For the right-hand half of the scale range, however, it is desired that the recorded curve be plotted in terms of the reciprocal of the signal values with the zero level being taken with respect to the right-hand scale extremity. This condition may be expressed mathematically by the following relationship:

$$E_m - e_o = \frac{B}{e_i} \tag{2}$$

where B denotes a proportionality constant and the quantity $E_m - e_o$ represents the signal value when taken with respect to the right-hand extremity of the scale range.

The proportionality constants A and B may be evaluated in terms of the output voltage $E_m$ required for maximum galvanometer deflection and the input voltage $E_h$ which is required to produce half-scale deflection by inserting into Equations 1 and 2 the mid-scale values of $e_i$ and $e_o$ expressed in terms of $E_m$ and $E_h$. When this is done, it is seen that:

$$A = \frac{\frac{1}{2}E_m}{E_h} \tag{3}$$

$$B = \frac{1}{2}E_m E_h \tag{4}$$

Substituting the value of A given by Equation 3 into Equation 1 gives the following relationship for the linear portion $S_1$ of the signal transfer characteristic of FIG. 3:

$$e_o = \left(\frac{E_m}{2E_h}\right) e_i \tag{5}$$

Similarly, substituting the value of B given by Equation 4 into Equation 2 and solving for $e_o$ gives the following relationship for the remainder of the scale range:

$$e_o = E_m \left(1 - \frac{E_h}{2e_i}\right) \tag{6}$$

This relationship given by Equation 6 is plotted as a curved portion $S_2$ of the signal transfer characteristic of FIG. 3. It is seen in FIG. 3 that this curved segment $S_2$ joins the straight line segment $S_1$ at the point $D_1$ corresponding to the chosen half-scale values for both the input and output signals. The extension of the straight line segment $S_1$ into the right-hand portion of the scale range is indicated by dash line $S_1'$ of FIG. 3, while the extension of the curved segment $S_2$ into the left-hand side of the scale range is indicated by a dash line $S_2'$. A consideration of the curved segments $S_2$ and $S_2'$ indicates that the relationship of Equation 6 is hyperbolic in nature. Consequently, the curved segment $S_2$ represents a portion of a hyperbola which, for increasing values of $e_i$, approaches the $E_m$ level in an asymptotic manner. Thus, looking from the left hand scale extremity, the level-sensitive signal-translating circuit should have a linear signal transfer characteristic over the first half of the scale range and a hyperbolic signal transfer characteristic over the second half of the range.

The desired hyperbolic signal transfer characteristic for the second half of the scale range is provided by systematically rendering the various diodes 61–67 conductive so as to reduce the effective overall gain of the amplifier system as a function of the value of the input signal $e_i$. This reduction in gain occurs step by step in an approximately hyperbolic manner. More specifically as the input signal $e_i$ increases, the output signal $e_o$ becomes more negative. At the point $D_1$ of FIG. 3, the output voltage $e_o$ assumes a negative value equal to the positive voltage drop across the resistor 81. As $e_o$ goes further negative, then the first diode 61 is rendered conductive because of the net negative voltage at the cathode thereof. This places the feedback resistor 71 in parallel with the feedback resistor 78, thus decreasing the total feedback resistance. This, in turn, increases the degree of negative feedback, thus reducing the effective overall gain of the amplifier system.

In view of the fact that the internal gain of amplifier 40 is quite high, the relation between the effective amplifier gain, that is, ratio of $e_o$ to $e_i$ and the input and feedback resistances associated therewith may be expressed mathematically by the following relationship:

$$e_o = -\frac{R_f}{R_i} \cdot e_i \qquad (7)$$

where $R_f$ represents the total effective feedback resistance and $R_i$ represents the resistance of the input resistor 45. Thus, by reducing the feedback resistance $R_f$, the effective overall gain is reduced.

Between the points $D_1$ and $D_2$ of FIG. 3, the effective gain factor remains constant at the new and reduced value produced by placing the feedback resistor 71 in parallel with resistor 78. This gain is represented by the slope of a straight line segment $d_1$ connecting the points $D_1$ and $D_2$. As the input signal $e_i$ further increases to a value corresponding to the point $D_2$ of FIG. 3, then the value of the negative output signal $e_o$ becomes equal to the total of the positive voltage drops across the resistors 81 and 82. This renders the second diode 62 ready for conduction, the first diode 61 remaining in its conductive condition. Any further increase in $e_i$ causes diode 62 to conduct which, in turn, places the further feedback resistor 72 in parallel with the feedback resistors 78 and 71. This further reduces the total value of $R_f$ and, hence, the effective gain factor. This new gain factor prevails over the range between points $D_2$ and $D_3$ and is represented by the slope of the straight line segment $d_2$ of FIG. 3.

As the input signal $e_i$ continues to increase and the output signal $e_o$ becomes more negative, additional ones of diodes 61–67 are rendered conductive to further reduce the total feedback resistance. As seen in FIG. 3, this causes the desired hyperbolic portion $S_2$ of the signal transfer characteristic to be approximated by a number of straight-line segments $d_1$, $d_2$, $d_3$ etc. The more diode paths that are utilized, the closer the actual signal transfer characteristic can be made to approach a true hyperbolic function. The number of diode paths required for a given degree of accuracy can be readily determined either mathematically or graphically. For the embodiment of FIG. 1, seven diode paths were found to provide an accuracy of $\pm 1\%$. Similarly, the specific voltage levels corresponding to the points $D_1$, $D_2$, $D_3$, etc. at which the various diodes are to be rendered conductive can be readily determined, either mathematically or graphically, once the absolute value of the maximum galvanometer voltage $E_m$ is selected or determined.

It is seen from the foregoing that the electrical signals supplied by the downhole sensing means 134 are modified by the level-sensitive amplifier system associated with the amplifier 40 and the biased diode feedback network 60 to suitably modify these signals so as to enable a linear galvanometer unit 22 to record a continuous curve H on the recording medium 18 wherein the signal values are linear in terms of resistivity on the left hand portion of the scale range, as shown by scale ($a$) of FIG. 2, and are linear in terms of conductivity on the right-hand portion of the scale range, as shown by scale ($b$) of FIG. 2. This enables the entire range of resistivity values from zero to infinity to be displayed on a single scale of finite width. It also provides for the recording of the lower range of resistivity values in an accurately linear manner which facilitates the interpretation of the recorded curve and enables accurate data for mathematical calculations to be obtained. Also, even for the right-hand half of the scale range, the interpretation is rendered relatively easy if the recorded curve values are thought of in terms of "conductivity" as opposed to "resistivity."

Figure 4:
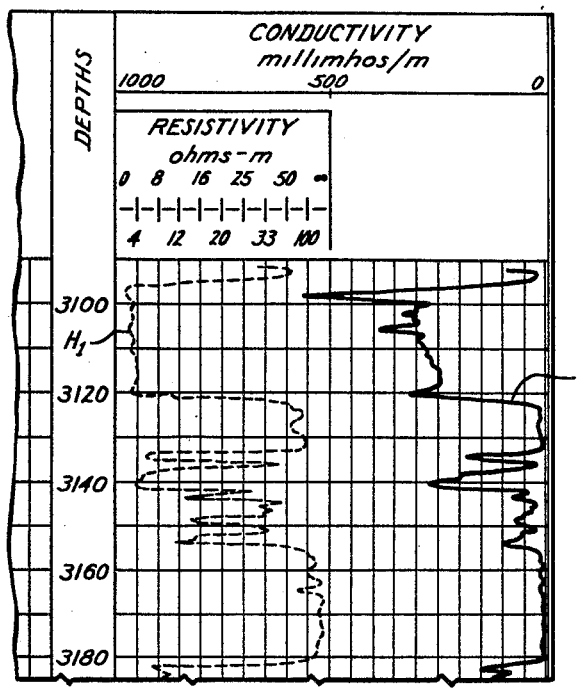
FIG. 4 is a portion of a typical log which may be obtained with the FIG. 1 apparatus.

A portion of a typical record or log obtained with the apparatus of this invention is shown in FIG. 4 as a dash line curve $H_1$ plotted under the resistivity scale heading. In this particular example, the corresponding conductivity scale heading was not printed on the log.

By adjustment of the control knob 44 associated with the calibrated attenuator 43 of FIG. 1, the mid-scale resistivity value may be set at other than the 20-ohm-meter value. As shown in FIG. 1 the control knob 44 may be set to provide either 10 or 50 ohm-meter mid-scale values if desired. If, for example, the control knob 44 is set to the 50 ohm-meter position, then a linear resistivity scale from 0 to 50 ohm-meters will be provided over the left hand half of the scale range. In this regard, the effective overall gain of the amplifier system over the linear resistivity range is selected to provide the requisite galvanometer deflection for the least sensitive setting of the control knob 44, namely, the 50 ohm-meter setting. In this manner, the consequent decrease in the attenuation factor of attenuator 43 as the control knob 44 is switched to the more sensitive 20 and 10 ohm-meter settings serves to increase the overall system sensitivity, thus requiring less input voltage to obtain a given scale deflection.

Up to this point, it has been assumed that the downhole sensing means 13 is operated to provide resistivity-type output signals. The downhole sensing means 13 may instead be operated to provide conductivity-type output signals. Suitable circuits for obtaining this type of operation of the sensing means 13, that is, this type of operation of $A_1$, $A_0$, $A_1$ electrode system shown in FIG. 1, are described in a copending application Serial No. 759,743 of M. Easterling, filed September 8, 1958. In this case, the signals coming up the armored cable 15 and into the attenuator 43 are directly proportional to the formation conductivity. The same level-sensitive signal-translating apparatus shown in FIG. 1 can, nevertheless, still be used to provide the same type of recorded curve as before. In this case, however, the galvanometer unit 22 is adjusted or rotated so as to place the light beam 33 on the right-hand extremity of the scale range when no output signal is supplied to the deflection coil 24. Also, the electrical connections to the galvanometer unit 22 are interchanged so that current flow through the deflection coil 24 will cause the light beam to deflect in the opposite direction, namely, from right to left. With these modifications, the conductivity-type input signals will be recorded in a linear manner over the first half of the scale range which, in this case, is the right-hand half, and in a hyperbolic manner over the second half of the scale range which, in this case, is the left-hand half. Thus, the same apparatus may be used with either resistivity-type or conductivity-type input signals.

In addition to passing the electrical signals through suitable means for providing the hybrid-type linear-resistivity linear-conductivity scale presentation of the present invention, it will frequently be desirable to record at the same time the original signals in an unmodified manner. This, of course, requires the use of a second galvanometer unit for the unmodified signals. The FIG. 4 log shows an example where both modified and unmodified curves are recorded on the same log, for the case of a conductivity type input signal. The dash line curve $H_1$ represents the hybrid-type scale presentation. The solid curve $H_2$ represents the unmodified conductivity-type signal which is recorded by a second galvanometer unit. It is recorded under the 0 to 1000 millimho/meter conductivity heading. Note that this conductivity scale range overlaps the hybrid-type scale range recorded under the resistivity scale heading.

Figure 5:
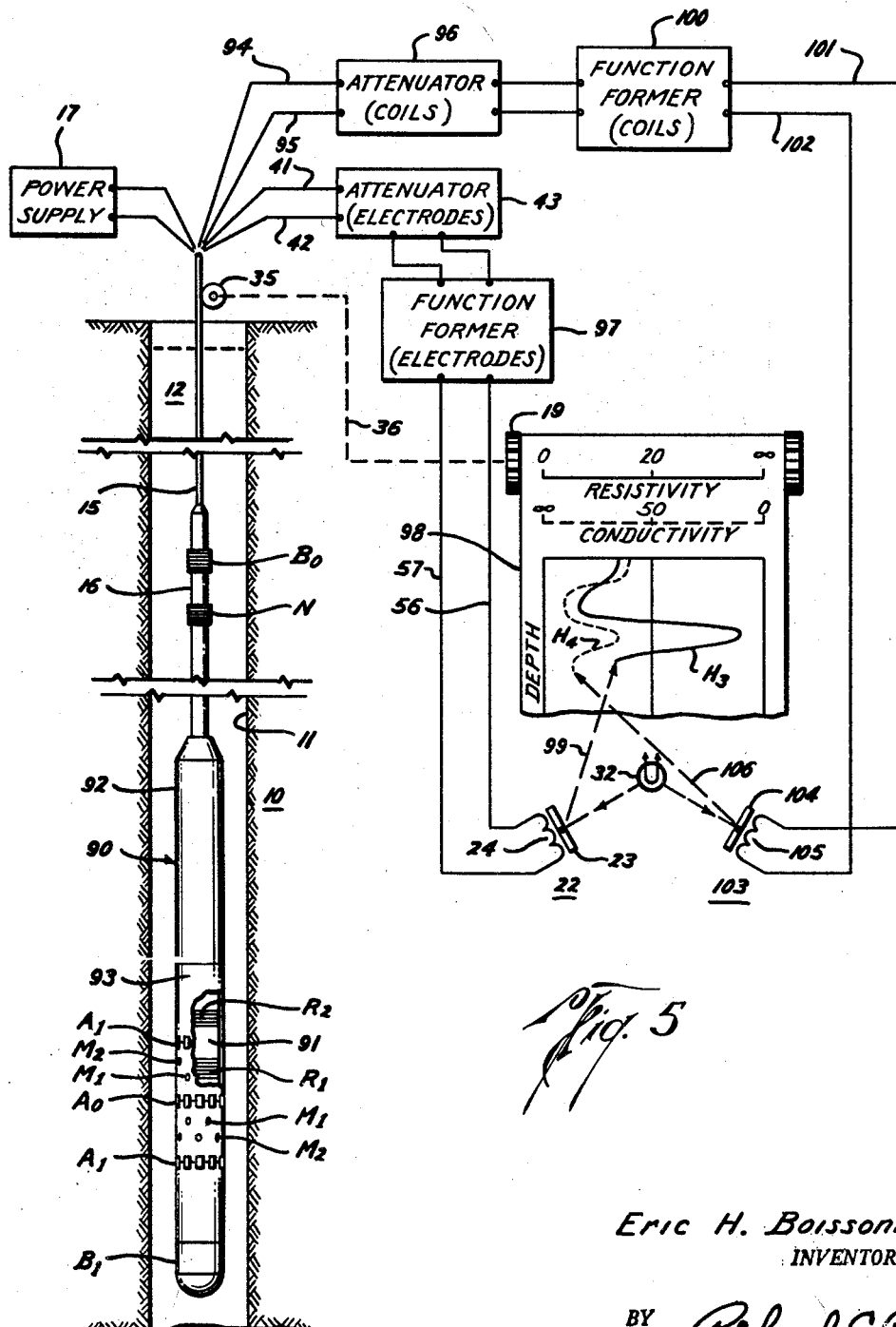
FIG. 5 is a partially cross-sectional, partly schematic view of a further embodiment of the present invention.

Referring now to FIG. 5 of the drawings, there is shown a different embodiment of borehole investigating apparatus constructed in accordance with the present invention. Elements and circuits which are the same as those shown in FIG. 1 are given the same reference numerals. The apparatus of FIG. 5 utilizes a different type of sensing means, indicated as sensing means 90, which is suspended in the borehole 11 by way of the armored multi-conductor cable 15. As before, the sensing means 90 is moved through the borehole 11 by raising or lowering the cable 15. The sensing means 90 of FIG. 5 includes both an electrode system and a coil system which are adapted for movement together through the borehole 11. The coil system includes a series of spaced apart transmitter and receiver coils wound around an interior mandrel portion 91 of the sensing means 90. Two of these coils are indicated by coils $R_1$ and $R_2$ which are visible in the portion of the drawing where the outer layer of sensing means 90 is partially broken away. Coil systems of this type are described in greater detail in Patent No. 2,582,314, granted to H. G. Doll on January 15, 1952. Suitable electrical circuits for energizing the transmitter coils and for monitoring the output signals developed by the receiver coils are included in fluid-tight instrument housing section 92 forming the upper part of the sensing means 90. Typical circuits suitable for this purpose are described in Patent No. 2,788,483, granted to H. G. Doll on April 9, 1957.

The electrode system portion of the sensing means 90 includes a series of seven spaced apart electrode rings which, reading from top to bottom, are designated $A_1$, $M_2$, $M_1$, $A_0$, $M_1$, $M_2$ and $A_1$, electrode rings having the same designation being internally connected to one another. These electrodes are located on the outer surface of a sleeve portion 93 which covers the inner mandrel 91 as well as the coils wound thereon. An electrode system of this general type is described in greater detail in Patent No. 2,712,627, granted to H. G. Doll on July 5, 1955. The specific type of electrode structures shown in FIG. 5, which structures are constructed to provide a minimum of interference with the underlying coil system, are described in greater detail in copending application Serial No. 743,604 of W. P. Schneider, filed June 23, 1958. The specific electrode system shown in FIG. 5 further differs from the general system described in the just mentioned Patent No. 2,712,627 in that the remote current-return electrode located on the cable insulation material 16 and designated $B_0$ is used as a current return for only the survey current emitted from the center $A_0$ electrode. The focussing current emitted from the outer $A_1$ electrodes is, instead, returned to an electrically-proximate current-return electrode designated $B_1$. This provides for a somewhat reduced depth of lateral penetration for the electrode system measurements. Suitable electrical circuits for operating the electrode system are also included within the instrument housing section 92 of the sensing means 90.

The coil system of FIG. 5 is intended primarily to provide a measurement of the conductivity of the formation material lying at a relatively great lateral distance from the center of the borehole 11. The electrode system, on the other hand, is intended to provide a measurement of the resistivity of the formation material lying at a lesser lateral distance from the center of the borehole. This resistivity measurement is considerably affected by the presence of any invaded zone in the case of a permeable formation. The resistivity type output signals developed by the electrode system are supplied by way of suitable conductors within the armored cable 15 and the further conductors 41 and 42 to the previously-mentioned attenuator 43. In a similar manner, the conductivity-type output signals produced by the coil system are transmitted by way of a different pair of conductors of the armored cable 15 and further conductors 94 and 95 to a second and separate attenuator 96. Attenuator 96 serves to set the mid-scale value for the conductivity-type coil signal on the recording medium. In most cases, the attenuator 96 will be set so that the mid-scale value in terms of conductivity corresponds to the reciprocal of the mid-scale value provided by the attenuator 43 for the electrode system resistivity signals.

The FIG. 5 apparatus further includes first and second level-sensitive variable-gain signal-translating circuits coupled to different ones of the electrode and coil system attenuators for separately modifying the respective signals to provide the novel hybrid-type of scale presentation of the present invention. The level-sensitive signal-translating circuit for the electrode system signals is indicated by a function former 97. This function former 97 is identical in construction to the level-sensitive signal-translating circuit described in FIG. 1 and, as such, includes the amplifier circuit 40 and the biased diode feedback network 60, as well as the other circuit elements associated therewith. Consequently, the function former 97 of FIG. 5 serves to translate resistivity signal values in the zero to mid-scale range in a linear manner, while translating resistivity signal values in the mid-scale to infinity range in a hyperbolic manner. The modified output signals from the function former 97 are, as before, supplied by way of conductors 56 and 57 to the deflection coil 24 associated with the galvanometer unit 22. For simplicity, the galvanometer mirror 23 and deflection coil 24 are indicated in a schematic manner in FIG. 5. The galvanometer mirror 23 is zeroed on a recording medium 98 at the left-hand side of the scale range. When electrical signals are applied to the galvanometer deflection coil 24, the consequent deflection of the mirror 23 serves to deflect a light beam 99 from the lamp 32 across the recording medium 98 to produce thereon the curve $H_3$. Curve $H_3$ thus provides a permanent record of the resistivity signal values. As before, the recording medium 98 is advanced in synchronism with the movement of the sensing means 90 through the borehole 11.

The coil system output signal appearing at the output side of the attenuator 96 is supplied to a second level-sensitive signal-translating circuit represented by a function former 100. This function former 100 is identical in construction to the function former 97 and, consequently, includes a high-gain amplifier, and a biased diode feedback network and associated elements like those shown in FIG. 1. Consequently, the function former 100 serves to translate conductivity-type input signals in the zero to mid-scale range in a linear manner, while translating conductivity signals in the mid-scale to infinity range in a hyperbolic manner. The modified output signals appearing at the output of the function former 100 are then applied by way of conductors 101 and 102 to a second linear galvanometer recording element 103. This galvanometer unit 103 is identical in construction to the galvanometer unit 22 and includes a light-reflecting mirror 104 mechanically connected to a galvanometer deflection coil 105. In this case, however, the galvanometer is zeroed at the right-hand side of the scale range. The polarity of the connections of the conductors 101 and 102 to the deflection coil 105 are such as to cause the mirror 104 to deflect a second light beam 106 across the recording medium 98 towards the left-hand side thereof as the conductivity signal values increase. In this manner, there is recorded on the recording medium 98 a continuous curve indicated by dash line curve $H_4$ which provides a permanent record of the coil system output signals as modified by the function former 100.

It is thus seen that the apparatus of FIG. 5 provides a pair of continuous curves $H_3$ and $H_4$ which are separately representative of the individual output signals developed by two different types of sensing systems which are adapted for movement through the borehole 11. Each of these curves is recorded on the recording medium 98 in the novel manner provided by the present invention so that wide ranges of signal variations may be recorded for both types of signals, while providing for linear presentation of signal values which are most frequently used for making mathematical calculations concerning various formation properties.

Figure 6:
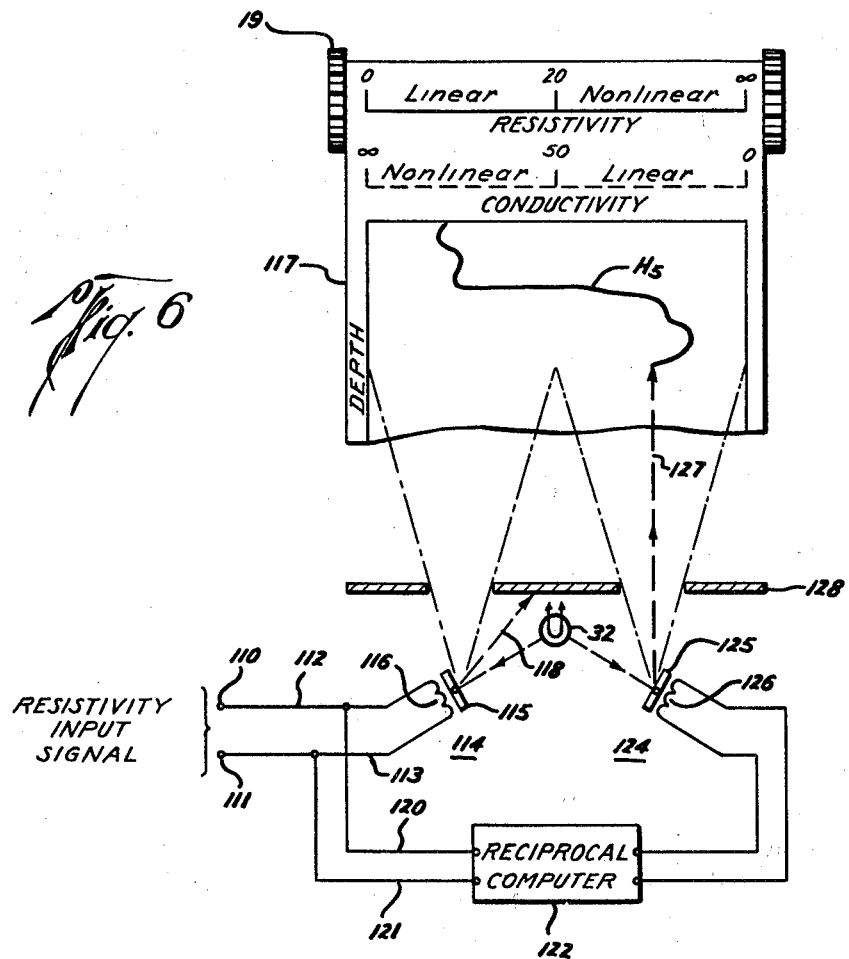
FIG. 6 shows a further form of apparatus constructed in accordance with the present invention.

Referring now to FIG. 6 of the drawings, there is shown a further embodiment of the present invention wherein a single continuous curve having the novel form of scale presentation of the present invention is provided by means of a pair of galvanometer units. It is assumed that resistivity-type measure signals are developed by a suitable borehole sensing unit and supplied to a pair of input terminals 110 and 111 of the FIG. 6 apparatus. For simplicity, the borehole sensing unit has not been shown in FIG. 6. This resistivity-type measure signal is then supplied directly by way of a linear signal-translating system including conductors 112 and 113 to a first linear recording element or linear galvanometer unit 114. Galvanometer unit 114 includes a light-reflecting mirror 115 and a deflection coil 116 mechanically connected thereto. Galvanometer unit 114 is zeroed at the left-hand side of a recording medium 117 and serves to deflect a light beam 118 across the recording medium 117 towards the right-hand side thereof for increasing signal values.

The input measure signals supplied to input terminals 110 and 111 are also supplied by way of conductors 120 and 121 to a non-linear signal-translating circuit indicated by a reciprocal computer 122. The reciprocal computer 122 serves to develop output signals which are directly proportional to the reciprocal of the signals supplied to the input terminals 110 and 111. This computer may be of the type described in greater detail in Patent No. 2,726,365, granted to K. A. Bilderback on December 6, 1955. The modified signal appearing at the output of the reciprocal computer 122 is then supplied to a second galvanometer unit 124 having a light-reflecting mirror 125 and a deflection coil 126 connected thereto. The galvanometer unit 124 is zeroed at the right-hand side of the scale range and serves to deflect a light beam 127 across the recording medium 117 towards the left-hand side thereof for increasing values of signal applied to the coil 126.

The apparatus of FIG. 6 further includes means for limiting the recording action of the left-hand galvanometer unit 114 to the left-hand half of the scale range and for limiting the recording action of the right-hand galvanometer unit 124 to the right-hand half of the scale range. This limiting means is indicated by an opaque light-blocking or optical stop member 128.

In operation, as the resistivity-type measure signal supplied to input terminals 110 and 111 increases from zero to a mid-scale value, the left-hand galvanometer unit 114 deflects in a linear manner to cause the light beam 118 to pass through the left-hand aperture in the stop member 128 to provide a linear record of the input signal values on the recording medium 117. At the same time, the reciprocal signal appearing at the output of the reciprocal computer 122 deflects the mirror 125 of the right-hand galvanometer unit 124 so as to attempt to deflect the light beam 127 over this same portion of the scale range. The light beam 127 is prevented from reaching recording medium 117, however, by the optical stop member 128.

As the input resistivity signal increases beyond the mid-scale value, the left-hand galvanometer unit 114 continues to deflect towards the right but now produces no record on the recording medium 117 because its light beam 118 is blocked by the stop member 128. At the same time, the light beam 127 from the right-hand galvanometer unit 124 passes through the right-hand aperture in the stop member 128 to produce a record on the recording medium 117 which represents the reciprocal of the input resistivity signal taken with respect to the right-hand extremity of the scale range. In this manner, the two galvanometer units 114 and 124 cooperate to produce a single continuous curve $H_5$ having the novel form of scale presentation of the present invention wherein the zero to mid-scale range is recorded in a linear manner in terms of resistivity and the mid-scale to infinity range is recorded in a hyperbolic manner in terms of resistivity or, in other words, in a linear manner in terms of conductivity.

The apparatus of FIG. 6 can also be used with conductivity-type measure signals to provide the hybrid-type scale presentation of the present invention. In this case, however, the reciprocal computer 122 is connected between the input terminals 110 and 111 and the left-hand galvanometer unit 114. At the same time, the right-hand galvanometer unit 124 is connected directly to the input terminals 110 and 111 so as to obtain deflections thereof which are linear in terms of conductivity.

While the present invention has been described for the particular cases of electrode and coil type borehole sensing units, it will be apparent to those skilled in the art that the principles of the present invention are equally applicable to other types of borehole sensing units such as acoustical sensing units, radioactivity-type sensing units or any other type of sensing units wherein the measure signals which are developed are subject to a wide range of variations and some portions of the range are of greater quantitative interest than other portions. In other words, the present invention enables a wide range of signal values to be recorded as a single continuous curve which, nevertheless, is precisely linear over selected portions of the range which are of particular quantitative interest. This, in turn, facilitates the interpretation of the recorded curve and enables more rapid and accurate calculation of desired earth formation parameters.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. In apparatus for investigating earth formations traversed by a borehole, the combination comprising: sensing means adapted for movement through the borehole for developing electrical signals representative of the numerical values of a characteristic property of the adjacent earth formations; and means for recording the electrical signals as a single graphical curve for which signal values in a first range are recorded as a linear function of the formation property numerical values and signal values in a second range are recorded as a linear function of the reciprocal of the formation property numerical values.

2. In apparatus for investigating earth formations traversed by a borehole, the combination comprising: electrical sensing means adapted for movement through the borehole for developing electrical signals representative of the electrical resistivity of the adjacent earth formations; and means for recording the electrical signals as a single graphical curve for which signal values in a first range are recorded as a linear function of formation resistivity and signal values in a second range are recorded as a linear function of formation conductivity.

3. In apparatus for investigating earth formations traversed by a borehole, the combination comprising: electrical sensing means adapted for movement through the borehole for developing electrical signals representative of the electrical conductivity of the adjacent earth formations; and means for recording the electrical signals as a single graphical curve for which signal values in a first range are recorded as a linear function of formation conductivity and signal values in a second range are recorded as a linear function of formation resistivity.

4. In apparatus for investigating earth formations traversed by a borehole, the combination comprising: sensing means adapted for movement through the borehole for developing electrical signals representative of the numerical values of a characteristic property of the adjacent earth formations; recording means responsive to the electrical signals for producing on a recording medium a single graphical curve as the sensing means moves through the borehole; and means for causing the portions of this curve produced by signal values in a first range to be recorded as a linear function of the formation property numerical values and for causing the portions of this curve produced by signal values in a second range to be recorded as a linear function of the reciprocal of the formation property numerical values.

5. In apparatus for investigating earth formations traversed by a borehole, the combination comprising: sensing means adapted for movement through the borehole for developing electrical signals representative of the numerical values of a characteristic property of the adjacent earth formations; recording means responsive to the electrical signals for producing on a recording medium a single graphical curve as the sensing means moves through the borehole; and means for causing the portions of this curve produced by signal values in a first range to be recorded as a linear function of the formation property numerical values on one portion of the recording medium and for causing the portions of this curve produced by signal values in the remaining range to be recorded as a linear function of the reciprocal of the formation property numerical values on an adjoining portion of the recording medium.

6. A method of investigating earth formations traversed by a borehole comprising: moving sensing means through the borehole for developing signals representative of the numerical values of a characteristic property of the adjacent earth formations; recording these signals as a single graphical curve for which signal values in a first range are recorded as a linear function of the formation property numerical values and signal values in a second range are recorded as a linear function of the reciprocal of the formation property numerical values.

7. In apparatus for investigating earth formations traversed by a borehole, the combination comprising: sensing means adapted for movement through the borehole for developing an electrical signal representative of a characteristic property of the adjacent earth formations; recording means having a movable recording medium and means responsive to the electrical signal for recording this signal as a single curve on such recording medium, the scale of electrical signal values being at right angles to the direction of movement of the recording medium; means for advancing the recording medium in synchronism with the movement of the sensing means through the borehole; and means for causing the electrical signal values for this signal recorded over one end of the scale range to be recorded in a linear manner with respect to the scale extremity at this end of the range and for causing the reciprocal of the electrical signal values for this signal falling outside of this one range to be recorded over the remainder of the scale in a linear manner with respect to the scale extremity at the other end of the range.

8. In apparatus for investigating earth formations traversed by a borehole, the combination comprising: sensing means adapted for movement through the borehole for developing an electrical signal representative of a characteristic property of the adjacent earth formations; linear recording means having a movable recording medium and means linearly responsive to the electrical signal for recording this signal as a single curve on such recording medium, the scale of electrical signal values being at right angles to the direction of movement of the recording medium; means for advancing the recording medium in synchronism with the movement of the sensing means through the borehole; and circuit means coupled in the electrical signal path intermediate the sensing means and the recording means for causing the electrical signal values for this signal recorded over one end of the scale range to be recorded in a linear manner with respect to the scale extremity at this end of the range and for causing the reciprocal of the electrical signal values for this signal falling outside of this one range to be recorded over the remainder of the scale in a linear manner with respect to the scale extremity at the other end of the range.

9. In apparatus for investigating earth formations traversed by a borehole, the combination comprising: sensing means adapted for movement through the borehole for developing electrical signals representative of the numerical values of a characteristic property of the adjacent earth formations; level-sensitive variable-gain signal-translating circuit means coupled to the sensing means and responsive to a first range of electrical signal values for developing output signals which are directly proportional to the input signals and responsive to the remaining range of electrical signal values for developing output signals which are proportional to the reciprocal of the input signals; and linear recording means responsive to these output signals for producing on a recording medium a single graphical curve which represents signal values in the first range as a linear function of the formation property and which represents signal values in the remaining range as a linear function of the reciprocal of the formation property numerical values.

10. In apparatus for investigating earth formations traversed by a borehole, the combination comprising: sensing means adapted for movement through the borehole for developing electrical signals representative of the numerical values of a characteristic property of the adjacent earth formations; a high-gain amplifier coupled to the sensing means and having level-sensitive feedback circuit means coupled thereto and responsive to a first range of electrical signal values for maintaining the amplifier gain constant and responsive to the remaining range of electrical signal values for varying the amplifier gain for developing output signals which are proportional to the reciprocal of the input signals; and linear recording means responsive to the amplifier output signals for producing on a recording medium a single continuous curve which represents signal values in the first range as a linear function of the formation property numerical values and which represents signal values in the remaining range as a linear function of the reciprocal of the formation numerical values.

11. In apparatus for investigating earth formations traversed by a borehole, the combination comprising: sensing means adapted for movement through the borehole for developing electrical signals representative of the numerical values of a characteristic property of the adjacent earth formations; level-sensitive variable-gain signal-translating circuit means coupled to the sensing means and responsive to a first range of electrical signal values for developing output signals which are directly and linearly proportional to the input signals and responsive to the remaining range of electrical signal values for developing output signals which are proportional to the reciprocal of the input signals; linear recording means responsive to these output signals for producing on a recording medium a single continuous curve which represents signal values in the first range as a linear function of the formation property numerical values and which represents signal values in the remaining range as a function of the reciprocal of the formation property numerical values; and attenuator means coupled in the electrical signal path intermediate the sensing means and the level-sensitive signal-translating circuit means for adjusting the characteristic property value at which the transition between linear and reciprocal recording occurs.

12. In apparatus for investigating earth formations traversed by a borehole, the combination comprising: an electrode system adapted for movement through the borehole for developing electrical signals representative of the resistivity of the adjacent earth formations; level-sensitive variable-gain signal-translating circuit means coupled to the electrode system and responsive to a first range of electrical signal values for developing output signals which are directly proportional to the input signals in this range and responsive to the remaining range of electrical signal values for developing output signals which are proportional to the reciprocal of the input signals in this range; and linear recording means responsive to these output signals for producing on a recording medium a single continuous curve which represents signal values in the first range as a linear function of formation resistivity and which represents signal values in the remaining range as a linear function of formation conductivity.

13. In apparatus for investigating earth formations traversed by a borehole, the combination comprising: a coil system adapted for movement through the borehole for developing electrical signals representative of the conductivity of the adjacent earth formations; level-sensitive variable-gain signal-translating circuit means coupled to the coil system and responsive to a first range of electrical signal values for developing output signals which are directly proportional to the input signals in this range and responsive to the remaining range of electrical signal values for developing output signals which are proportional to the reciprocal of the input signals in this range; and linear recording means responsive to these output signals for producing on a recording medium a single continuous cure which represents signal values in the first range as a linear function of formation conductivity and signal values in the remaining range as a linear function of formation resistivity.

14. In apparatus for investigating earth formations traversed by a borehole, the combination comprising: an electrode system and a coil system adapted for movement together through the borehole for developing electrical signals respectively representative of the resistivity and the conductivity of the adjacent earth formations; first and second level-sensitive variable-gain signal-translating circuit means coupled to different ones of the electrode and coil systems and each responsive to a first range of electrical signal values for developing output signals which are directly proportional to the input signals in this range and each responsive to the remaining range of electrical signal values for developing output signals which are proportional to the reciprocal of the input signals in this range; and linear recording means having first and second means individually responsive to the modified electrode signals and the modified coil signals respectively, for producing on a recording medium corresponding first and second continuous curves the first of which represents signal values in the first range as a linear function of formation resistivity and signal values in the remaining range as a linear function of formation conductivity and the second of which represents signal values in the first range as a linear function of formation conductivity and signal values in the remaining range as a linear function of formation resistivity, both curves being on the same scale with their resistivity regions on the same portion thereof.

15. In apparatus for investigating earth formations traversed by a borehole, the combination comprising: sensing means adapted for movement through the borehole for developing electrical signals representative of a characteristic property of the adjacent earth formations; linear signal-translating circuit means coupled to the sensing means and responsive to a first range of electrical signal values for developing output signals which are directly proportion to the input signals in this range; nonlinear signal-translating circuit means coupled to the sensing means and responsive to the remaining range of electrical signal values for developing output signals which are proportional to the reciprocal of the input signals in this range; and linear recording means responsive to both sets of these output signals for producing on a recording medium a linear record of signal values in the first range and a record of the reciprocal of signal values in the remaining range.

16. In apparatus for investigating earth formations traversed by a borehole, the combination comprising: sensing means adapted for movement through the borehole for developing electrical signals representative of a characteristic property of the adjacent earth formations; linear signal-translating circuit means coupled to the sensing means and responsive to a first range of electrical signal values for developing output signals which are directly proportional to the input signals in this range; reciprocal computer means coupled to the sensing means and responsive to the remaining range of electrical signal values for developing output signals which are proportional to the reciprocal of the input signals in this range; and linear recording means responsive to both sets of these output signals for producing on a recording medium a single continuous curve providing a linear record of signal values in the first range and a linear record of the reciprocal of signal values in the remaining range.

17. In apparatus for investigating earth formations traversed by a borehole, the combination comprising: sensing means adapted for movement through the borehole for developing electrical signals representative of a characteristic property of the adjacent earth formations; linear signal-translating circuit means coupled to the sensing means and responsive to a first range of electrical signal values for developing linear output signals which are directly proportional to the input signals in this range; reciprocal computer means coupled to the sensing means and responsive to the remaining range of electrical signal values for developing output signals which are proportional to the reciprocal of the input signals in this range; linear recording means having a movable recording medium, an electrical scale range at right angles to the direction of movement of the recording medium and a pair of electrically-responsive linear recording elements which are zeroed at opposite extremities of the scale range, one of these recording elements being responsive to the linear output signals for producing a record which is linear with respect to the scale extremity at which this recording element is zeroed and the other of these recording elements being responsive to the reciprocal output signals for producing a record which is linear with respect to the other scale extremity; means for limiting the recording action of one of the recording elements to a region of the scale range adjoining its zero extremity and for limiting the recording action of the other recording element to the remainder of the scale range; and means for advancing the recording medium in synchronism with the movement of the sensing means through the borehole.

References Cited by the Examiner
UNITED STATES PATENTS

| | | | |
|---|---|---|---|
| 2,079,485 | 5/37 | Bousman | 324—132 X |
| 2,457,214 | 12/48 | Doll | 346—65 |
| 2,492,901 | 12/48 | Sweet | 324—132 X |
| 2,707,768 | 5/55 | Owen | 324—1 |
| 2,776,402 | 1/57 | Kokesh | 324—1 |
| 2,810,107 | 10/57 | Sauber | 324—132 |
| 2,841,778 | 7/58 | Ball et al. | 324—1 X |
| 2,871,444 | 1/59 | Piety | 324—1 |
| 2,884,589 | 4/59 | Campbell | 324—1 |
| 3,041,535 | 6/62 | Cochran | 324—132 X |

WALTER L. CARLSON, *Primary Examiner.*

SAMUEL BERNSTEIN, LLOYD McCOLLUM,
*Examiners.*